United States Patent
Kopp et al.

(10) Patent No.: US 10,024,444 B2
(45) Date of Patent: Jul. 17, 2018

(54) INTEGRATED STRUCTURE ELECTRO-HYDRAULIC VALVE

(71) Applicant: Moog Inc., East Aurora, NY (US)

(72) Inventors: John Kopp, West Seneca, NY (US); Christopher Mazurkiewicz, West Seneca, NY (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 14/380,420

(22) PCT Filed: Nov. 16, 2012

(86) PCT No.: PCT/US2012/065545
§ 371 (c)(1),
(2) Date: Aug. 22, 2014

(87) PCT Pub. No.: WO2013/126105
PCT Pub. Date: Aug. 29, 2013

(65) Prior Publication Data
US 2015/0047729 A1    Feb. 19, 2015

Related U.S. Application Data

(60) Provisional application No. 61/602,583, filed on Feb. 23, 2012.

(51) Int. Cl.
*F16K 11/07* (2006.01)
*F16K 11/078* (2006.01)
(Continued)

(52) U.S. Cl.
CPC ........ *F16K 11/078* (2013.01); *F15B 13/0402* (2013.01); *F15B 13/0444* (2013.01);
(Continued)

(58) Field of Classification Search
CPC ....................................................... F16K 11/07
(Continued)

(56) References Cited

U.S. PATENT DOCUMENTS 2,767,689 A   10/1956   Moog, Jr.
2,920,650 A    1/1960   Moog, Jr.
(Continued)

FOREIGN PATENT DOCUMENTS

CN   201297301 Y   8/2009
DE   199 09 712 A1   9/2000
(Continued)

OTHER PUBLICATIONS

The International Search Report (ISR) for International (PCT) Application No. PCT/US2012/065545; Publication No. WO 2013/126105; dated Apr. 16, 2013.
(Continued)

*Primary Examiner* — Michael R Reid
*Assistant Examiner* — Paul J Gray
(74) *Attorney, Agent, or Firm* — Harter Secrest & Emery LLP

(57) ABSTRACT

The improved servovalve broadly (20) includes: a body (21) having an axis of elongation (y-y), a portion of the body defining a cylinder (43) having an axis (x-x) substantially perpendicular to the body axis; a valve member (44) movably mounted in the cylinder, and adapted to be moved off-null in either direction along the cylinder axis to selectively meter the flows of fluid between a plurality of ports defined between the spool and cylinder; a rotor (58) mounted on the body for rotation about the body axis; a motor (69) acting between the body and rotor, and selectively operable to cause the rotor to rotate in a desired
(Continued)

angular direction relative to the body; and a quill-like transfer member (64) acting between the rotor and valve spool.

23 Claims, 2 Drawing Sheets

(51) Int. Cl.
*F15B 13/04* (2006.01)
*F15B 13/044* (2006.01)
*F16K 31/04* (2006.01)

(52) U.S. Cl.
CPC .............. *F16K 11/07* (2013.01); *F16K 31/04* (2013.01); *Y10T 137/86501* (2015.04)

(58) Field of Classification Search
USPC ............ 137/625.48, 625.25, 625.65, 625.69; 251/129.11
See application file for complete search history.

(56) References Cited

U.S. PATENT DOCUMENTS

| | | | |
|---|---|---|---|
| 3,103,739 A | | 9/1963 | Moog |
| 3,228,423 A | | 1/1966 | Moog, Jr. |
| 4,203,507 A | | 5/1980 | Tomita et al. |
| 4,325,412 A | | 4/1982 | Hayner |
| 4,466,597 A | | 8/1984 | Vanderlaan |
| 4,641,812 A | | 2/1987 | Vanderlaan et al. |
| 4,742,322 A | | 5/1988 | Johnson et al. |
| 4,793,377 A | * | 12/1988 | Haynes ............... F15B 13/0405 137/331 |
| 4,951,549 A | | 8/1990 | Olsen et al. |
| 5,031,563 A | | 7/1991 | Matre |
| 5,031,653 A | | 7/1991 | Wilson et al. |
| 5,146,126 A | | 9/1992 | Hutchins |
| 5,263,680 A | | 11/1993 | Laux |
| 5,419,419 A | * | 5/1995 | Macpherson ......... F16D 41/088 137/625.47 |
| 6,000,678 A | | 12/1999 | Coakley |
| 6,199,588 B1 | | 3/2001 | Shapiro |

FOREIGN PATENT DOCUMENTS

| | | |
|---|---|---|
| EP | 0038128 A1 | 10/1981 |
| EP | 0 102 884 A1 | 3/1984 |
| EP | 1067321 A2 | 9/2000 |
| FR | 1 409 269 A | 8/1965 |
| FR | 1409269 A | 8/1965 |
| FR | 2 281 533 A1 | 3/1976 |
| FR | 2281533 A1 | 3/1976 |
| JP | S59-47508 A | 3/1984 |
| JP | 2-29368 U | 2/1990 |
| JP | H0797200 A | 4/1995 |
| JP | H08-028717 A | 2/1996 |
| JP | 2002-527686 A | 8/2002 |
| JP | 2011-256917 A | 12/2011 |
| WO | 90/02884 A1 | 3/1990 |
| WO | 00/22304 A1 | 4/2000 |
| WO | 03/014577 A1 | 2/2003 |

OTHER PUBLICATIONS

The International Search Report (ISR) for International (PCT) Application No. PCT/US2012/024547; Publication No. WO 2013/119240; dated Nov. 2, 2012.
The Written Opinion of the International Search Authority for International (PCT) Application No. PCT/US2012/024547; Publication No. WO 2013/119240; dated Nov. 2, 2012.
The International Preliminary Report on Patentability for International (PCT) Application No. PCT/US2012/024547; Publication No. WO 2013/119240; dated Aug. 12, 2014.
"Digital Valves for Fluid Control". Victor Controls, LLC. Dated May 2, 2002. Accessed at http://www.victorycontrols.com/ds%20servo.pdf on Sep. 14, 2011.

* cited by examiner

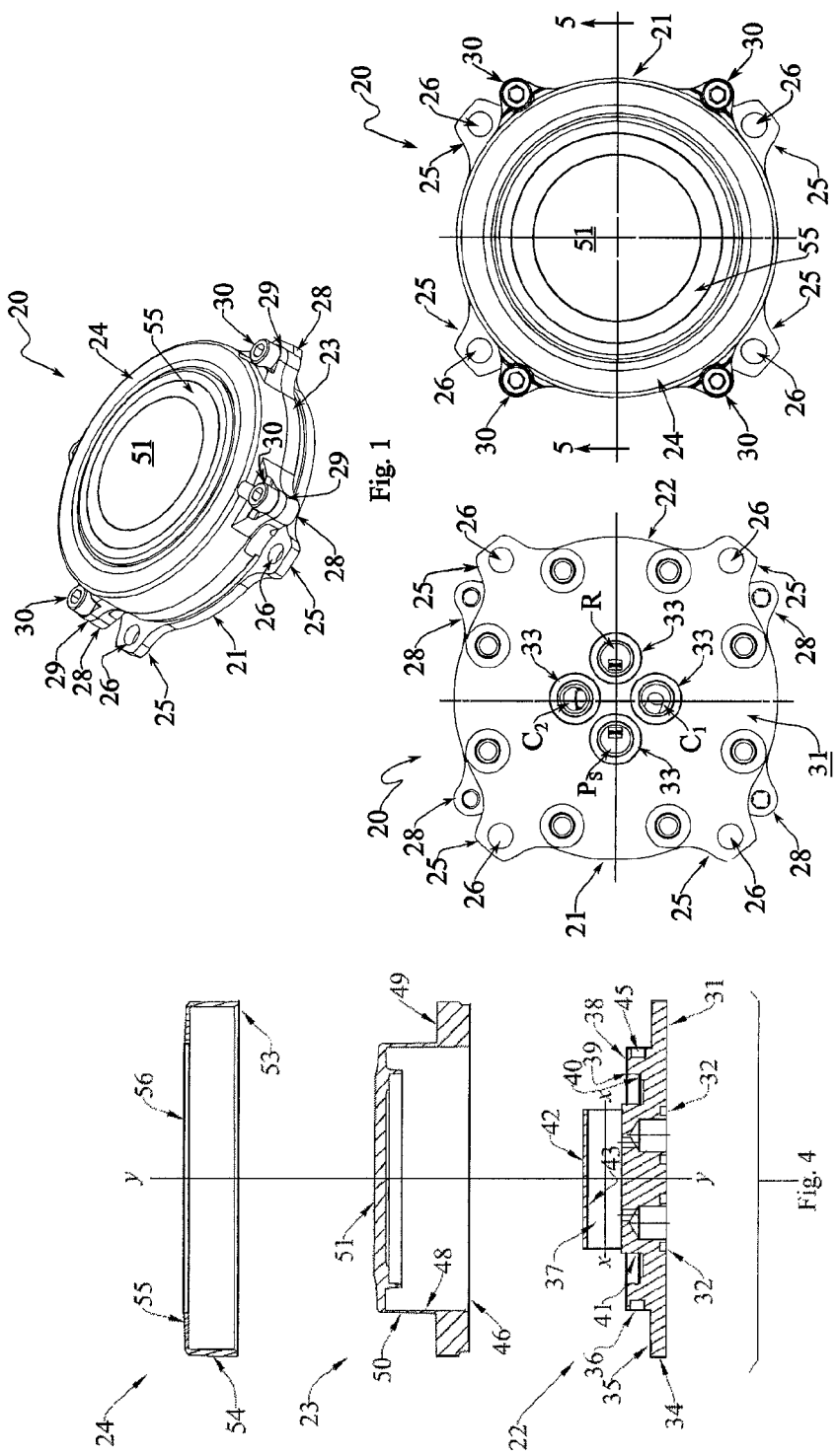

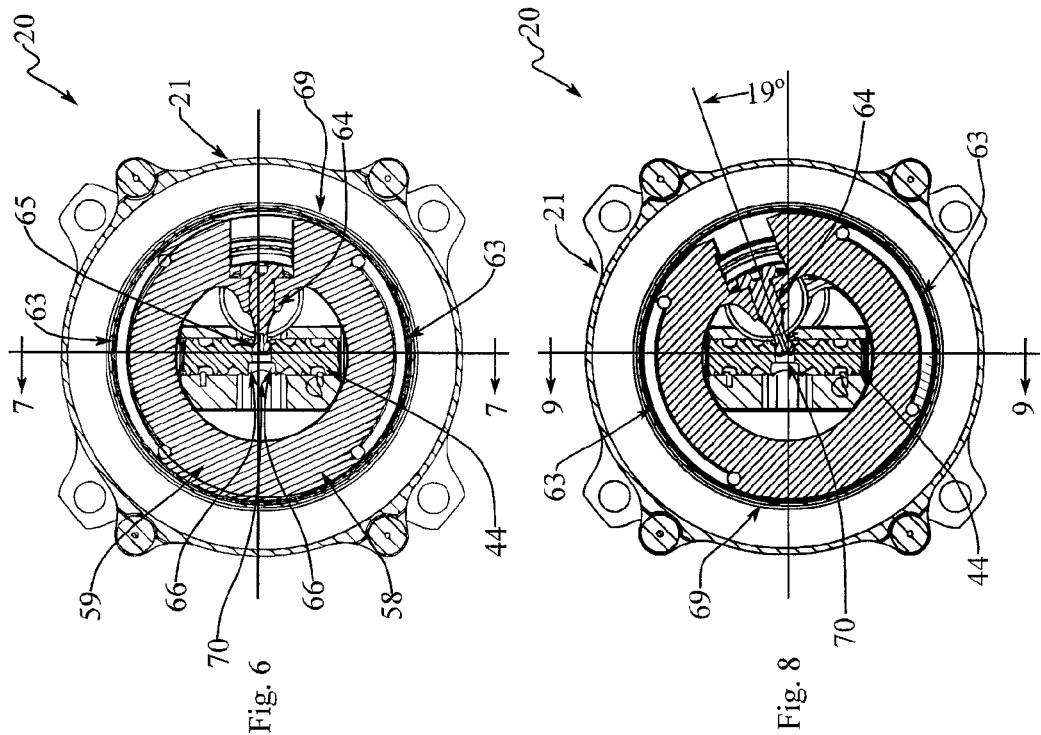
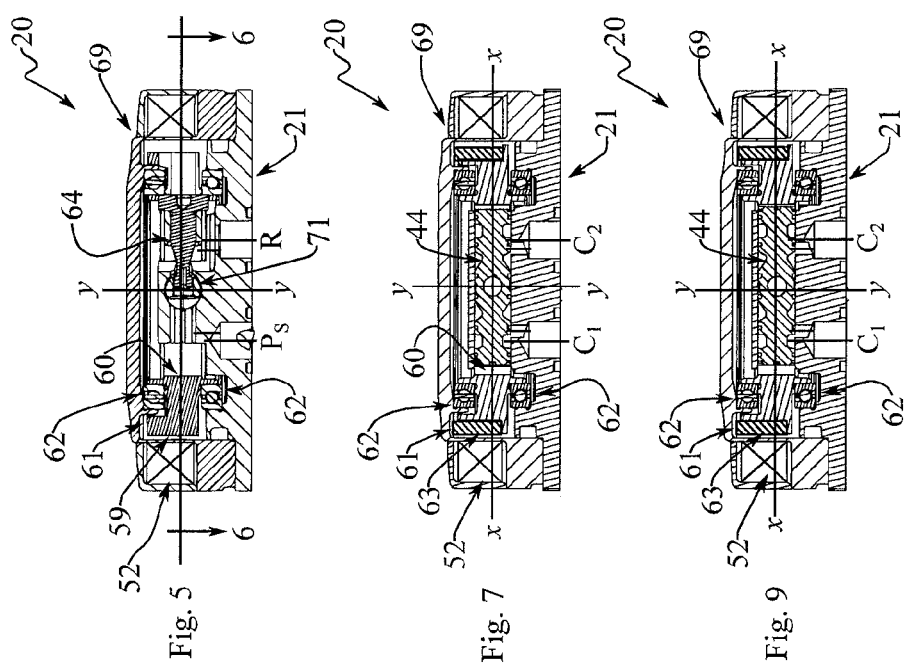
Fig. 5  Fig. 7  Fig. 9
Fig. 6  Fig. 8

INTEGRATED STRUCTURE ELECTRO-HYDRAULIC VALVE

TECHNICAL FIELD

The present invention relates generally to the field of electrohydraulic servovalves, and, more particularly, to improved direct-drive servovalves in which a electric motor-driven rotor is directly coupled to a valve spool.

BACKGROUND ART

Electrohydraulic servovalves are well known. These may be thought of as having either a single stage, or as having multiple stages. In both forms, a valve spool is slidably mounted within a cylinder for controlled movement therealong. When the valve spool is in a centered or null position within the cylinder, various lands on the valve spool cover ports that communicate with the control outlets to prevent flow through the valve. The direction and magnitude of spool movement off-null controls the flows through the valve. Various forms of single-stage servovalves are representatively shown and described in U.S. Pat. No. 4,951,549, U.S. Pat. No. 5,263,680, U.S. Pat. No. 4,641,812 and U.S. Pat. No. 5,146,126, the aggregate disclosures of which are hereby incorporated by reference.

A single-stage or direct-drive valve generally has a motor or some other mechanism that directly engages the valve spool, and which selectively causes the spool to move off-null. A multiple-stage valve may have a pilot stage that controls movement of a valve spool in a second stage. The pilot stage may be an electrical section, and the second stage may be a hydraulic section. One example of a two-stage electrohydraulic servovalve is shown and described in U.S. Pat. No. 3,228,423 A, the aggregate disclosure of which is hereby incorporated by reference.

DISCLOSURE OF THE INVENTION

With parenthetical reference to the corresponding parts, portions or surfaces of the disclosed embodiment, merely for purposes of illustration and not by way of limitation, provided is an improved direct-drive servovalve, of which a first embodiment (20) is illustrated and described.

The improved servovalves broadly include: a body (21) having an axis of elongation (y-y), a portion of the body defining a chamber (43) having an axis (x-x) substantially perpendicular to the body axis (y-y); a valve member (44) movably mounted in the chamber, and adapted to be moved off-null in either direction along the member axis to selectively meter the flows of fluid between a plurality of ports defined between the valve member and chamber; a rotor (58) mounted on the body for rotation about the body axis; a motor (69) acting between the body and rotor, and selectively operable to cause the rotor to rotate in a desired angular direction relative to the body; and a quill-like transfer member (64) acting between the rotor and valve member such that relative rotation between the rotor and body in one angular direction will cause the valve member to move off-null in one direction along the chamber axis to enable the metering of a first flow through the valve, and relative rotation between the rotary in body in the opposite angular direction will cause the valve member to move off-null in the opposite direction along the chamber axis to enable the metering of a second flow through the valve; and wherein the rotor surrounds the chamber.

The chamber may be a cylinder. The valve member may be a valve spool or a shear plate.

The spool may have a slot (70) bounded by substantially-parallel walls (66, 66), and wherein the member is mounted on the rotor and has a rounded marginal end portion (65) engaged with the slot walls.

The rounded marginal end portion may engage the slot walls with substantially-frictionless rolling contact when the rotor rotates relative to the body.

The rounded marginal end portion may have portions (71, 71) that are biased into engagement with the slot walls.

The motor may include a coil (52) mounted on one of the rotor and body, and may include a plurality of magnets (63, 63) mounted on the other of the rotor and body.

The rotor may be an armature of the motor.

The improved servovalve may further include at least one bearing (62, 62) acting between the rotor and body.

The improved servovalve may be a four-way valve.

In another aspect, provided is a direct-drive servovalve, comprising: a body, a portion of the body defining a sealed chamber, a first port and a second port, the first and second ports in fluid communication with the sealed chamber, a valve member movably mounted in the sealed chamber and adapted to be moved off-null along a first direction to selectively meter a flow of fluid between the first port and the second port, an electric motor having a stator and a rotor, the stator mounted to the body, and the rotor arranged inside the sealed chamber, a transfer member acting between the rotor and the valve member such that relative movement between the rotor and the body in one direction will cause the valve member to move off-null and enable the metering of a first flow through the valve.

The stator may be arranged outside of the sealed chamber.

The valve member may be movably mounted and adapted to be moved off-null along a second direction to selectively meter a flow of fluid between the first port and the second port, and the transfer member may be arranged and configured to act between the rotor and the valve member such that relative movement between the rotor and the body in a second direction will cause the valve member to move off-null and enable the metering of a second flow through the valve.

The motor may be a rotary motor or a linear motor. The motor may be a torque motor or a torroidal motor.

The valve member may be a valve spool and the body may include a cylinder. The valve spool may be movably mounted within the cylinder.

The valve member may be a shear plate.

The valve spool may have a slot bounded by substantially-parallel walls, and the quill-like member may be mounted on the rotor and have a rounded marginal end portion engaged with the slot walls.

The rounded marginal end portion may engage the slot walls with substantially-frictionless rolling contact when the rotor rotates relative to the body.

The rounded marginal end portion may have portions that are biased into engagement with the slot walls.

The motor may include a coil mounted on one of the rotor and stator, and may include a plurality of magnets mounted on the other of the rotor and stator.

The rotor may be an armature of the motor.

The direct-drive servovalve may further include at least one bearing acting between the rotor and body. The servovalve may be a four-way valve.

The servovalve may be configured and arranged to provide a mechanical advantage between a force applied by the stator to the rotor and a force applied by the transfer member to the valve member.

The servovalve may be configured and arranged such that a motor magnetic flux passes across a boundary of the sealed chamber.

Accordingly, the general object of this invention is to provide an improved direct-drive servovalve.

These and other advantages will become apparent from the foregoing and ongoing written specification, the drawings, and the appended claims.

BRIEF DESCRIPTION OF THE DRAWINGS

FIG. 1 is an isometric view of a first form of the improved direct-drive servovalve.

FIG. 2 is a bottom plan view of the servovalve shown in FIG. 1.

FIG. 3 is a top plan view of the servovalve shown in FIG. 1.

FIG. 4 is a fragmentary longitudinal sectional view of the servovalve body shown in FIG. 1, this view showing the body parts in exploded relation to one another.

FIG. 5 is a fragmentary longitudinal vertical sectional view thereof, taken generally on line 5-5 of FIG. 3, showing the quill as being mounted on the rotor and operatively engaging the valve spool.

FIG. 6 is fragmentary transverse horizontal sectional view thereof, taken generally on line 6-6 of FIG. 5, showing the valve spool as being in a centered or null position relative to the cylinder to prevent flow through the valve.

FIG. 7 is a fragmentary longitudinal vertical sectional view thereof, taken generally on line 7-7 of FIG. 6, again showing the valve spool as being in its centered or null position relative to the cylinder.

FIG. 8 is a fragmentary transverse horizontal sectional view thereof, generally similar to FIG. 6, but shows the rotor as having been rotated about 19° in a counterclockwise direction from the position shown in FIG. 6, this movement producing concomitant movement of the valve spool off-null to enable flow through the valve.

FIG. 9 is a fragmentary longitudinal vertical sectional view thereof, taken generally on line 9-9 of FIG. 8, and shows the valve spool as having been moved to the off-null position when the rotor has been rotated to the position shown in FIG. 8.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, the disclosed embodiments broadly provide an improved direct-drive servovalve, of which a first embodiment is generally indicated at 20.

The improved servovalve is shown as having an assembled body, generally indicated at 21. As best shown in FIG. 4, the assembled body includes a lower or base part 22, an intermediate or central part 23, and an upper or top part 24.

As best shown in FIGS. 1-3, the body base portion 22 is shown as having four circularly-spaced ears, severally indicated at 25. Each of these ears is provided with a mounting hole 26, by means of which the improved servovalve may be operatively mounted on other structure (not shown). Other circularly-spaced ears, severally indicated at 28, 29, respectively, extend outwardly from the base intermediate and top parts, respectively. These ears have holes (not shown) to receive and accommodate fasteners, severally indicated at 30, by which the base may be assembled. The various ears are seen in FIGS. 1-3, but are not seen in the other drawing figures.

As best shown in FIG. 2, the body base part has operative connections to supply pressure Ps, a fluid return R and two control ports, C1, C2, respectively. Hence, because there are four fluid connections, this valve is a four-way servovalve. However, it should be clearly understood that the embodiments are not limited to four-way valves, but could be readily adapted to a three-way valve, or some other form, as desired.

Referring now to FIG. 4, the body base part 22 is shown as being a specially-configured vertically-elongated member having a planar bottom surface 31. A plurality of annular grooves, severally indicated at 32, extend upwardly into the body base part from its bottom surface 31 to surround the various fluid inlets and outlets. These grooves are adapted to receive O-rings (not shown) by which the body base part may be sealingly mounted on other structure (not shown). The body base part is shown as sequentially including: an outwardly-facing vertical cylindrical surface 34 extending upwardly from the outer margin of base surface 31, an upwardly-facing annular horizontal surface 35 extending inwardly from the upper margin of surface 34, an outwardly-facing vertical cylindrical surface 36, an upwardly-facing horizontal annular surface 38, an inwardly-facing vertical cylindrical surface 39, an upwardly-facing specially-configured bottom surface 40, an outwardly-facing vertical cylindrical surface 41 rising upwardly therefrom, and a mesa-like portion 37 rising axially upwardly therefrom. The base part has an uppermost planar horizontal surface 42. This mesa-like portion is provided with a horizontal through-bore, generally indicated at 43, which forms a chamber to receive and accommodate sliding movement of a valve member, generally indicated at 44 (FIGS. 5-9). In this embodiment, the through-bore has a circular cross section such that the chamber is a cylinder. However, the through-bore may have non-circular cross sections, causing the chamber to be a non-cylindrical shape, such as a rectangular prism, or other similar shape. The valve member in this embodiment is a cylindrical valve spool. However, the valve member may have alternative shapes, such as a rectangular prism forming a shear plate. Thus, the assembled base, and each of its component parts, is shown as having a vertical longitudinal axis y-y, and the cylinder is shown as having a horizontal longitudinal axis x-x. As best shown in FIG. 4, an annular groove 45 extends horizontally into the body base part from surface 36 to receive and accommodate an O-ring (not shown), by means of which the body intettuediate part may be sealingly mounted on the body base part.

In the embodiment shown, the valve spool is mounted directed within the cylinder 43. However, persons skilled in this art will readily appreciate that a bushing (not shown) could be provided in the base through-bore and the valve spool could be mounted in the bushing. (See, e.g., U.S. Pat. No. 2,767,689, U.S. Pat. No. 2,920,650 and U.S. Pat. No. 3,103,739, the aggregate disclosures of which are hereby incorporated by reference, for representative illustrations of a valve spool being mounted in a bushing provided within a body).

Still referring principally to FIG. 4, the body intermediate part 23 is shown as being a specially-configured vertically-elongated annular member having a downwardly-facing annular horizontal bottom surface 46 adapted to face and engage body base part upper surface 35, and as having an inwardly-facing vertical cylindrical surface 48 rising upwardly from the inner margin of base surface 46 to face body lower part surface 36. Base intermediate part surface 48 extends above body surface 36. The body intermediate part has an upwardly- and outwardly-facing annular notch, defined by an upwardly-facing annular horizontal surface 49 and an outwardly-facing vertical cylindrical surface 50, to receive and accommodate an annular coil, generally indicated at 52 (FIGS. 5, 7 and 9). The body intermediate part also has a top part 51.

The body upper part 24 is shown as being in the nature of a cover which protectively surrounds and covers coil 52. This body intermediate part has a lowermost annular horizontal surface 53 that is adapted to engage intermediate part surface 49, a cylindrical portion 54 continuing upwardly therefrom, and an in-turned upper portion 55 terminating in a central axial through-hole 56. As previously noted, the body upper part 24 is in the nature of a cover that is mounted on the body intermediate portion, and which encircles and protectively encloses coil 52.

As best shown in FIGS. 6 and 8, rotor 58 is rotatably mounted on the assembled base for rotation about base vertical axis y-y. This rotor is shown as being a specially-configured C-shaped disk-like member having an outwardly-facing vertical cylindrical surface 59 arranged in spaced facing relation to the thin-walled web defined between body intermediate part surfaces 48, 50, having an opposite inwardly-facing vertical cylindrical surface 60, having an annular horizontal upper surface 61, and having an annular horizontal lower surface 62. An annular groove extends downwardly into the rotor from its upper surface 61 to receive and accommodate a bearing 62, by means of which the rotor is journalled on the base top portion. Another groove extends downwardly into the base lower part from surface 38 to receive and accommodate another bearing, again indicated at 62, by means of which the rotor is journalled on the base lower portion. A pair of segmented annular permanent magnets, severally indicated at 63, are mounted in recesses provided in the outer periphery of the rotor to interact with coil 52, when energized. A quill-like member, generally indicated at 64, is operatively mounted on the rotor. This member has a rounded distal end portion 65 received between two facing parallel planar walls, severally indicated at 66, provided in the valve spool 44.

As best shown in FIGS. 6-9, the valve spool 44 has a plurality of lands and grooves along its longitudinal extent in the usual manner, and is adapted to be selectively and controllably shifted either leftwardly or rightwardly, as desired, within the cylinder from the null position shown in FIG. 7. In the null position, respective lands on the valve spool cover the appropriate ports communicating with the control openings C1, C2 to prevent flow through the valve.

The coil may be selectively energized by supplying it with a current of appropriate magnitude and plurality to cause the rotor to rotate about the base axis y-y in either a clockwise or counterclockwise direction. The direction of rotor movement is determined by the polarity of the supplied current. The magnitude of angular rotor movement is determined by the magnitude of the supplied current. In FIG. 8, the rotor is shown as having moved approximately 19° in a counterclockwise direction from the position shown in FIG. 6. As this occurs, the quill causes the valve spool to move in one axial direction within the cylinder. This is shown in FIG. 9, which depicts the valve spool as having been moved off-null and to the right to expose control ports communicating with outlet C1 and C2. Thus, this displaced condition of the spool will enable fluid to flow through the valve. If the polarity of the supplied current were reversed, the spool could be cause to move in a clockwise direction off null to displace the spool in the opposite direction relative to the cylinder.

Therefore, the improved servovalves broadly include: a body 21 having an axis of elongation y-y, a portion of the body defining a chamber 43 having an axis x-x substantially perpendicular to the body axis y-y; a valve member 44 movably mounted in the chamber, and adapted to be moved off-null in either direction along the cylinder axis to selectively meter the flows of fluid between a plurality of ports defined between the valve member and chamber; a rotor 58 mounted on the body for rotation about the body axis; a motor 69 acting between the body and rotor, and selectively operable to cause the rotor to rotate in a desired angular direction relative to the body; and a quill-like member 64 acting between the rotor and valve member such that relative rotation between the rotor and body in one angular direction will cause the valve member to move off-null in one direction along the cylinder axis to enable the metering of a first flow through the valve, and relative rotation between the rotary in body in the opposite angular direction will cause the spool to move off-null in the opposite direction along the chamber axis to enable the metering of a second flow through the valve; and wherein the rotor surrounds the chamber.

The rotor, coil and the permanent magnets form a motor 69 which may be selectively operated to controllably cause the rotor to rotate in the appropriate angular direction and by the appropriate magnitude relative to the body for selectively displacing the valve member off-null.

The present invention expressly contemplates that many changes and modifications may be made.

For example, the size, shape and configuration of the various parts are not deemed to be critical, except as may be incorporated in the appended claims. Nor are the materials of construction deemed to be critical. As previously indicated, the valve spool may be slidably mounted directly on the base, or may be slidably mounted within a bushing inserted into a through-bore provided on the base. The quill has one marginal end portion secured to the rotor for movement therewith, and has a distal marginal end portion provided with a rounded head. In one embodiment, the head is split, so that the rounded head portion consists of two portions that are biased away from one another so as to maintain frictionless rolling contact with the walls of the valve spool in which the rounded head is mounted. The position of the magnets and coil may be reversed, if desired. If desired, centering springs could be placed in the spool end chambers to urge the spool to move back toward a null position when the coil is de-energized.

Alternative motor types may be used to cause the rotor to rotate relative to the body, such as a torroidal motor, a torque motor, or other similar motor.

Therefore, while the presently preferred form of the improved direct-drive servovalve has been shown and described, and several modifications thereof discussed, persons skilled in this art will readily appreciate that various additional changes and modifications may be made without departing from the spirit of the invention, as defined and differentiated by the following claims.

What is claimed is:

1. A direct-drive servovalve, comprising:
a body having an axis of elongation, a portion of said body defining a valve chamber having an axis substantially perpendicular to said body axis;
a valve member movably mounted in said valve chamber, and adapted to be moved off-null in either direction along said chamber axis to selectively meter the flows of fluid between a plurality of ports defined between said valve member and said valve chamber;
a motor having a stator and a rotor, said rotor mounted on said body for rotation about said body axis;
said motor selectively operable to cause said rotor to rotate in a desired angular direction relative to said body; and
a transfer member acting between said rotor and valve member such that relative rotation between said rotor and body in one angular direction will cause said valve member to move off-null in one direction along said valve chamber axis to enable a first flow through said valve, and relative rotation between said rotor and body in the opposite angular direction will cause said valve member to move off-null in the opposite direction along said chamber axis to enable a second flow through said valve; and
wherein said rotor surrounds said valve member and said valve chamber about said body axis.

2. The direct-drive servovalve as set forth in claim 1 wherein said chamber is a cylinder.

3. The direct-drive servovalve as set forth in claim 1 wherein said valve member is a valve spool.

4. The direct-drive servovalve as set forth in claim 1 wherein said valve member has a slot bounded by substantially-parallel walls, and wherein said transfer member is mounted on said rotor and has a rounded marginal end portion engaged with said slot walls.

5. The direct-drive servovalve as set forth in claim 4 wherein said rounded marginal end portion engages said slot walls with substantially-frictionless rolling contact when said rotor rotates relative to said body.

6. The direct-drive servovalve as set forth in claim 4 wherein said rounded marginal end portion has portions that are biased into engagement with said slot walls.

7. The direct-drive servovalve as set forth in claim 1 wherein said motor includes a coil mounted on one of said rotor and body, and includes a plurality of magnets mounted on the other of said rotor and body.

8. The direct-drive servovalve as set forth in claim 7 wherein said rotor is an armature of said motor.

9. The direct-drive servovalve as set forth in claim 1, and further comprising: at least one bearing acting between said rotor and body.

10. The direct-drive servovalve as set forth in claim 1 wherein said servovalve is a four-way valve.

11. A direct-drive servovalve, comprising:
a body, a portion of said body defining a sealed chamber;
a valve member movably mounted in a valve chamber that is within said sealed chamber, said valve member adapted to be moved off-null along a first direction to selectively meter a flow of fluid between a first port and a second port, said first and second ports in fluid communication with said valve chamber;
an electric motor having a stator and a rotor, said rotor comprising a magnet configured to interact with said stator such that said rotor is selectively rotatable about a body axis relative to said body;
said stator mounted to said body and arranged outside of said sealed chamber, and said magnet of said rotor arranged inside said sealed chamber;
said rotor arranged to surround said valve member and said valve chamber about said body axis; and
a transfer member acting between said rotor and said valve member such that relative movement between said rotor and said body in one direction will cause said valve member to move off-null and enable the metering of a first flow through said valve.

12. The direct-drive servovalve as set forth in claim 11 wherein said valve member is movably mounted and adapted to be moved off-null along a second direction to selectively meter a flow of fluid between said first port and said second port; and said transfer member is acting between said rotor and said valve member such that relative movement between said rotor and said body in a second direction will cause said valve member to move off-null and enable the metering of a second flow through said valve.

13. The direct-drive servovalve as set forth in claim 11 wherein said motor is a rotary motor.

14. The direct-drive servovalve as set forth in claim 11 wherein said valve member is a valve spool and said body includes a cylinder, said valve spool movably mounted within said cylinder.

15. The direct-drive servovalve as set forth in claim 11 wherein said valve member has a slot bounded by substantially-parallel walls, and wherein said transfer member is mounted on said rotor and has a rounded marginal end portion engaged with said slot walls.

16. The direct-drive servovalve as set forth in claim 15 wherein said rounded marginal end portion engages said slot walls with substantially-frictionless rolling contact when said rotor rotates relative to said body.

17. The direct-drive servovalve as set forth in claim 15 wherein said rounded marginal end portion has portions that are biased into engagement with said slot walls.

18. The direct-drive servovalve as set forth in claim 11 wherein said stator of said motor includes a coil.

19. The direct-drive servovalve as set forth in claim 11 wherein said rotor is an armature of said motor.

20. The direct-drive servovalve as set forth in claim 11, and further comprising: at least one bearing acting between said rotor and body.

21. The direct-drive servovalve as set forth in claim 11 wherein said servovalve is a four-way valve.

22. The direct-drive servovalve as set forth in claim 11 wherein said servovalve is configured and arranged to provide a mechanical advantage between a force applied by said stator to said rotor and a force applied by said transfer member to said valve member.

23. The direct-drive servovalve as set forth in claim 11 wherein a motor magnetic flux passes across a boundary of said sealed chamber.

* * * * *